(12) United States Patent
Shakhnovich

(10) Patent No.: US 8,771,411 B2
(45) Date of Patent: Jul. 8, 2014

(54) MODIFIED PIGMENTS

(75) Inventor: Alexander I. Shakhnovich, Arlington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 13/697,809

(22) PCT Filed: May 13, 2011

(86) PCT No.: PCT/US2011/036404
§ 371 (c)(1),
(2), (4) Date: Nov. 14, 2012

(87) PCT Pub. No.: WO2011/143533
PCT Pub. Date: Nov. 17, 2011

(65) Prior Publication Data
US 2013/0061773 A1    Mar. 14, 2013

Related U.S. Application Data

(60) Provisional application No. 61/395,649, filed on May 14, 2010.

(51) Int. Cl.
*C09D 11/02* (2014.01)
(52) U.S. Cl.
USPC ........................................ 106/31.6; 106/31.78
(58) Field of Classification Search
USPC .............................................. 106/31.6, 31.78
See application file for complete search history.

(56) References Cited

U.S. PATENT DOCUMENTS

| 5,922,118 A | 7/1999 | Johnson et al. |
| 6,478,863 B2 | 11/2002 | Johnson et al. |
| 2003/0101901 A1 | 6/2003 | Bergemann et al. |

FOREIGN PATENT DOCUMENTS

| GB | 2385331 A | 8/2003 |
| JP | 08-337735 | 12/1996 |
| JP | 2005-524751 | 8/2005 |
| JP | 2009-517492 | 4/2009 |
| KR | 10-0463353 | 6/2005 |

OTHER PUBLICATIONS

International Search Report and The Written Opinion of the International Searching Authority, or the Declaration of International Application No. PCT/US2011/036404, mailed on Feb. 29, 2012.
Shakhnovich, "Dispersant Chemistry Gives Up Its Secrets", Eur. Coatings J., Issued, p. 28, (2006).
International Preliminary Report on Patentability for International Application No. PCT/US2011/036404, mailed on Nov. 29, 2011.
Supplementary European Search Report for EP 11781336.0, mailed from the European Patent Office on Jan. 3, 2014.

*Primary Examiner* — Veronica F Faison

(57) ABSTRACT

Modified pigments including an organic group containing a 5-membered heteroaromatic ring, as well as related compositions, articles, and methods, are disclosed. The diazonium salts containing a 5-membered heteroaromatic ring exhibit enhanced activity in modifying pigments, thereby resulting in modified pigments with a higher treatment level and improved dispersibility in an ink composition.

10 Claims, No Drawings

MODIFIED PIGMENTS

CROSS-REFERENCE TO RELATED APPLICATION

This application is a national phase application under 35 U.S.C. §371 of International Application Number PCT/US2011/036404, filed on May 13, 2011, which claims priority to U.S. Provisional Patent Application No. 61/395,649, filed on May 14, 2010, the disclosure of which is incorporated herein by reference.

TECHNICAL FIELD

This disclosure relates to pigments modified with an organic group containing a 5-membered heteroaromatic ring, as well as related compositions, articles, and methods.

BACKGROUND

Ink compositions generally contain water soluble dyes or pigments. Although some dye-based inks are suitable for their intended purposes, dyes have several disadvantages when used in inkjet ink compositions. For examples, water-soluble dyes may dissolve and run when exposed to moisture or water. Dye images may further smear or rub off on contact with felt pen markers or upon being rubbed or touched by finger. Dyes also exhibit poor light stability when exposed to visible light, ultraviolet light, or sunlight. Pigments may also be used as colorants in ink compositions.

SUMMARY

The inventor has realized that certain diazonium salts containing a 5-membered heteroaromatic ring exhibit enhanced activity in modifying pigments, thereby resulting in modified pigments with a higher treatment level and improved dispersibility in an ink composition. It is believed that such diazonium salts can also be used to effectively modify pigments that might not otherwise be modifiable.

In one aspect, this disclosure features a method that includes (1) reacting a diazotizing agent with a primary amine containing a 5-membered heteroaromatic ring and an amino group directly bonded to the 5-membered heteroaromatic ring, thereby forming a reaction mixture containing a diazonium salt that includes the 5-membered heteroaromatic ring; and (2) after the diazonium salt is formed, adding a pigment to the reaction mixture, thereby forming a modified pigment that includes the 5-membered heteroaromatic ring. The 5-membered heteroaromatic ring includes at least two ring heteroatoms, at least one of which is a nitrogen atom.

In another aspect, this disclosure features a method that includes reacting a pigment with a diazonium salt containing a 5-membered heteroaromatic ring and a diazonium group directly bonded to the 5-membered heteroaromatic ring, thereby forming a modified pigment that contains the 5-membered heteroaromatic ring. The 5-membered heteroaromatic ring includes three ring heteroatoms, at least two of which are nitrogen atoms.

In another aspect, this disclosure features a method that includes reacting a pigment with a diazonium salt containing a 5-membered heteroaromatic ring, thereby forming a modified pigment that includes the 5-membered heteroaromatic ring. The diazonium salt includes a cation of formula (IIa):

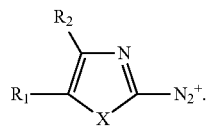

In this formula, X is O, N($R_a$) or S; and each of $R_1$ and $R_2$, independently, is H, $C_1$-$C_{10}$ alkyl, $C_2$-$C_{10}$ alkenyl, $C_2$-$C_{10}$ alkynyl, $C_3$-$C_{20}$ cycloalkyl, $C_3$-$C_{20}$ cycloalkenyl, $C_1$-$C_{20}$ heterocycloalkyl, $C_1$-$C_{20}$ heterocycloalkenyl, aryl, heteroaryl, halo, cyano, $OR_b$, $COOR_b$, $OC(O)R_b$, $C(O)R_b$, $C(O)NR_bR_c$, $SO_3R_c$, $NR_bR_c$, or $N^+(R_bR_cR_d)Y$, each of $R_a$, $R_b$, $R_c$, and $R_d$, independently, being H, $C_1$-$C_{10}$ alkyl, $C_3$-$C_{20}$ cycloalkyl, $C_1$-$C_{20}$ heterocycloalkyl, aryl, or heteroaryl and Y being an anion; provided that at least one of $R_1$ and $R_2$ is not H.

In another aspect, this disclosure features an ink composition that includes a liquid vehicle, and a material containing a pigment and an organic group bonded to the pigment. The organic group includes only one aromatic ring and the only one aromatic ring is a 5-membered heteroaromatic ring. The 5-membered heteroaromatic ring includes three ring heteroatoms, at least two of which are nitrogen atoms.

In another aspect, this disclosure features a composition that includes a pigment, and an organic group bonded to the pigment. The organic group includes only one aromatic ring and the only one aromatic ring is a 5-membered heteroaromatic ring. The 5-membered heteroaromatic ring includes three ring heteroatoms, at least two of which are nitrogen atoms.

In another aspect, this disclosure features an ink composition that includes a liquid vehicle, and a material containing a pigment and an organic group bonded to the pigment. The organic group is of formula (IIb):

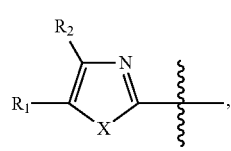

In this formula, X is O, N($R_a$), or S; and each of $R_1$ and $R_2$, independently, is H, $C_1$-$C_{10}$ alkyl, $C_2$-$C_{10}$ alkenyl, $C_2$-$C_{10}$ alkynyl, $C_3$-$C_{20}$ cycloalkyl, $C_3$-$C_{20}$ cycloalkenyl, $C_1$-$C_{20}$ heterocycloalkyl, $C_1$-$C_{20}$ heterocycloalkenyl, aryl, heteroaryl, halo, cyano, $OR_b$, $COOR_b$, $OC(O)R_b$, $C(O)R_b$, $C(O)NR_bR_c$, $SO_3R_c$, $NR_bR_c$, or $N^+(R_bR_cR_d)Y$, each of $R_a$, $R_b$, $R_c$, and $R_d$, independently, being H, $C_1$-$C_{10}$ alkyl, $C_3$-$C_{20}$ cycloalkyl, $C_1$-$C_{20}$ heterocycloalkyl, aryl, or heteroaryl and Y being an anion; provided that at least one of $R_1$ and $R_2$ is not H.

In another aspect, this disclosure features a composition that includes a pigment, and an organic group bonded to the pigment. The organic group is of formula (IIb) described above.

In another aspect, this disclosure features an ink composition that includes a liquid vehicle, and a material containing a pigment and an organic group bonded to the pigment. The organic group includes a 5-membered heteroaromatic ring that contains four ring heteroatoms, at least three of which are nitrogen atoms.

In another aspect, this disclosure features a composition that includes a pigment, and an organic group bonded to the pigment. The organic group includes a 5-membered heteroaromatic ring that contains four ring heteroatoms, at least three of which are nitrogen atoms.

Other features, objects, and advantages of the disclosure will be apparent from the description and the claims.

DETAILED DESCRIPTION

This disclosure generally relates to methods of reacting a primary amine containing a 5-membered heteroaromatic ring with a diazotizing agent to form a diazonium salt, which in turn can be used to treat to a pigment to form a modified pigment with improved dispersibility in an ink composition.

In general, the primary amine includes a 5-membered heteroaromatic ring and an amino group. In some embodiments, the 5-membered heteroaromatic ring is the only aromatic ring in the primary amine. In other embodiments, the primary amine includes one or more additional aromatic rings (e.g., heteroaromatic rings or aromatic rings without heteroaromatic ring atoms). The one or more additional aromatic rings can be covalently bonded or fused to the 5-membered heteroaromatic ring. In certain embodiments, the primary amine can include more than one amino group (e.g., two or three amino groups).

Typically, the amino group is directly bonded to the 5-membered heteroaromatic ring. Without wishing to be bound by theory, it is believed that a diazonium salt derived from a primary amine in which an amino group is directly bonded to a 5-membered heteroaromatic ring exhibits enhanced activity in modifying pigments compared to that derived from a primary amine in which an amino group is not directly bonded to a 5-membered heteroaromatic ring. In addition, without wishing to be bound by theory, it is believed that a diazonium salt derived from a primary amine in which an amino group is directly bonded to a 5-membered heteroaromatic ring exhibits enhanced activity in modifying pigments compared to that derived from a primary amine in which an amino group is directly bonded to an aromatic ring other than a 5-membered heteroaromatic ring (e.g., a 6-membered aromatic or heteroaromatic ring).

In general, the 5-membered heteroaromatic ring in the primary amine includes at least two ring heteroatoms (e.g., two, three, or four ring heteroatoms).

When the 5-membered heteroaromatic ring in the primary amine includes three ring heteroatoms, at least two of the ring heteroatoms can be nitrogen atoms. Examples of such 5-membered heteroaromatic rings include 1,2,4-triazolyl, 1,2,3-triazolyl, 1,3,4-thiadiazolyl, 1,2,4-thiadiazolyl, 1,2,3-thiadiazolyl, 1,2,5-thiadiazolyl, 1,3,4-oxadiazolyl, 1,2,4-oxadiazolyl, 1,2,3-oxadiazolyl, and 1,2,5-oxadiazolyl.

When the 5-membered heteroaromatic ring in the primary amine includes three ring heteroatoms, the primary amine can be a compound of formula (I):

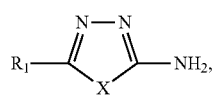

(I)

In this formula, X can be O, N($R_a$), or S; and $R_1$ can be H, $C_1$-$C_{10}$ alkyl, $C_2$-$C_{10}$ alkenyl, $C_2$-$C_{10}$ alkynyl, $C_3$-$C_{20}$ cycloalkyl, $C_3$-$C_{20}$ cycloalkenyl, $C_1$-$C_{20}$ heterocycloalkyl, $C_1$-$C_{20}$ heterocycloalkenyl, aryl, heteroaryl, halo, cyano, $OR_b$, $COOR_b$, $OC(O)R_b$, $C(O)R_b$, $C(O)NR_bR_c$, $SO_3R_c$, $NR_bR_c$, or $N^+(R_bR_cR_d)Y$, in which each of $R_a$, $R_b$, $R_c$, and $R_d$, independently, can be H, $C_1$-$C_{10}$ alkyl, $C_3$-$C_{20}$ cycloalkyl, $C_1$-$C_{20}$ heterocycloalkyl, aryl, or heteroaryl and Y can be an anion. In general, Y can be any suitable anion, such as chloride, bromide, iodide, sulfate, nitrate, phosphate, citrate, methanesulfonate, trifluoroacetate, acetate, malate, tosylate, tartrate, fumurate, glutamate, glucuronate, lactate, glutarate, or maleate.

A subset of the compounds of formula (I) can be those in which $R_1$ is H, $C_1$-$C_{10}$ alkyl, $COOR_a$, $C(O)NH(C_1$-$C_{10}$ alkyl), or phenyl optionally substituted with $C_1$-$C_{10}$ alkyl, in which $C_1$-$C_{10}$ alkyl is optionally substituted with fluoro, $OR_a$, $COOR_a$, or $N^-(R_bR_cR_d)$. For example, the primary amine of formula (I) can be compounds 1-10 listed below:

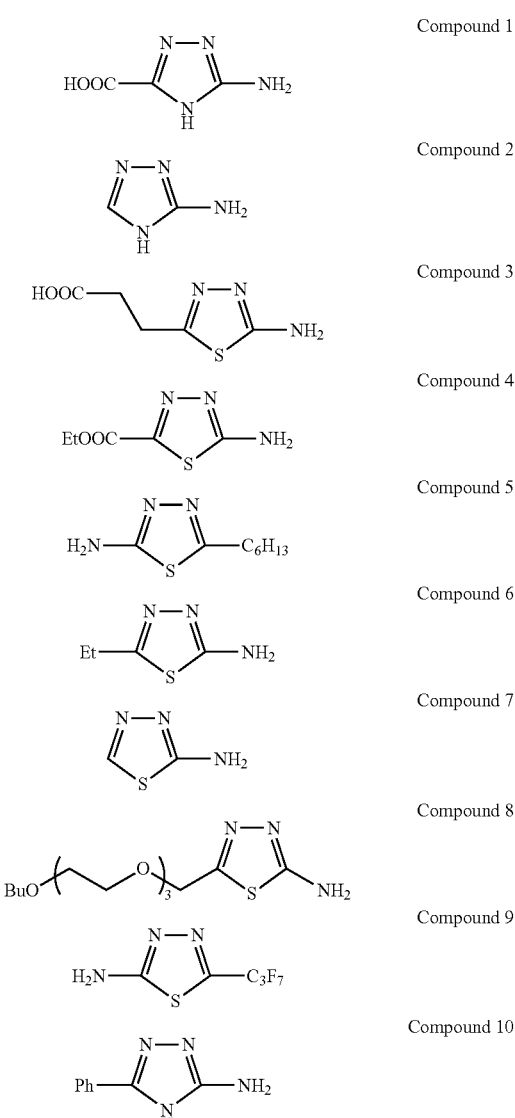

As used herein, the term "alkyl" refers to a saturated, linear or branched, non-cyclic hydrocarbon moiety, such as —$CH_3$ or —$CH(CH_3)_2$. The term "alkenyl" refers to a linear or branched, non-cyclic hydrocarbon moiety that contains at least one double bond, such as —CH=CH—$CH_3$. The term "alkynyl" refers to a linear or branched, non-cyclic hydrocarbon moiety that contains at least one triple bond, such as —C≡C—$CH_3$. The term "cycloalkyl" refers to a saturated, cyclic hydrocarbon moiety, such as cyclohexyl. The term "cycloalkenyl" refers to a non-aromatic, cyclic hydrocarbon moiety that contains at least one double bond, such as cyclohexenyl. The term "heterocycloalkyl" refers to a saturated, cyclic moiety having at least one ring heteroatom (e.g., N, O, or S), such as 4-tetrahydropyranyl. The term "heterocycloalkenyl" refers to a non-aromatic, cyclic moiety having at least one ring heteroatom (e.g., N, O, or S) and at least one ring double bond, such as pyranyl. The term "aryl" refers to a hydrocarbon moiety having one or more aromatic rings. Examples of aryl moieties include phenyl (Ph), phenylene, naphthyl, naphthylene, pyrenyl, anthryl, and phenanthryl. The term "heteroaryl" refers to a moiety having one or more aromatic rings that contain at least one heteroatom (e.g., N, O, or S). Examples of heteroaryl moieties include furyl, furylene, fluorenyl, pyrrolyl, thienyl, oxazolyl, imidazolyl, thiazolyl, pyridyl, pyrimidinyl, quinazolinyl, quinolyl, isoquinolyl and indolyl.

Alkyl, alkenyl, alkynyl, cycloalkyl, cycloalkenyl, heterocycloalkyl, heterocycloalkenyl, aryl, and heteroaryl mentioned herein include both substituted and unsubstituted moieties, unless specified otherwise. Possible substituents on cycloalkyl, cycloalkenyl, heterocycloalkyl, heterocycloalkenyl, aryl, and heteroaryl include, but are not limited to, $C_1$-$C_{10}$ alkyl, $C_2$-$C_{10}$ alkenyl, $C_2$-$C_{10}$ alkynyl, $C_3$-$C_{20}$ cycloalkyl, $C_3$-$C_{20}$ cycloalkenyl, $C_1$-$C_{20}$ heterocycloalkyl, $C_1$-$C_{20}$ heterocycloalkenyl, $C_1$-$C_{10}$ alkoxy, aryl, aryloxy, heteroaryl, heteroaryloxy, amino, $C_1$-$C_{10}$ alkylamino, $C_1$-$C_{20}$ dialkylamino, arylamino, diarylamino, $C_1$-$C_{10}$ alkylsulfonamino, arylsulfonamino, $C_1$-$C_{10}$ alkylimino, arylimino, $C_1$-$C_{10}$ alkylsulfonimino, arylsulfonimino, hydroxyl, halo, thio, $C_1$-$C_{10}$ alkylthio, arylthio, $C_1$-$C_{10}$ alkylsulfonyl, arylsulfonyl, acylamino, aminoacyl, aminothioacyl, amidino, guanidine, ureido, cyano, nitro, nitroso, azido, acyl, thioacyl, acyloxy, carboxyl, and carboxylic ester. On the other hand, possible substituents on alkyl, alkenyl, or alkynyl include all of the above-recited substituents except $C_1$-$C_{10}$ alkyl, $C_2$-$C_{10}$ alkenyl, and $C_2$-$C_{10}$ alkynyl. Cycloalkyl, cycloalkenyl, heterocycloalkyl, heterocycloalkenyl, aryl, and heteroaryl also include those containing fused rings.

When the 5-membered heteroaromatic ring in the primary amine includes two ring heteroatoms, at least one of the ring heteroatoms can be a nitrogen atom. Examples of such 5-membered heteroaromatic rings include imidazolyl, pyrazolyl, thiazolyl, isothiazolyl, oxazolyl, and isoxazolyl.

When the 5-membered heteroaromatic ring in the primary amine includes two ring heteroatoms, the primary amine can be a compound of formula (II):

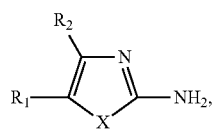

(II)

In this formula, X can be O, N($R_a$), or S; and each of $R_1$ and $R_2$, independently, can be H, $C_1$-$C_{10}$ alkyl, $C_2$-$C_{10}$ alkenyl, $C_2$-$C_{10}$ alkynyl, $C_3$-$C_{20}$ cycloalkyl, $C_3$-$C_{20}$ cycloalkenyl, $C_1$-$C_{20}$ heterocycloalkyl, $C_1$-$C_{20}$ heterocycloalkenyl, aryl, heteroaryl, halo, cyano, $OR_b$, $COOR_b$, $OC(O)R_b$, $C(O)R_b$, $C(O)NR_bR_c$, $SO_3R_c$, $NR_bR_c$, or $N^+(R_bR_cR_d)Y$, in which each of $R_a$, $R_b$, $R_c$, and $R_d$, independently, can be H, $C_1$-$C_{10}$ alkyl, $C_3$-$C_{20}$ cycloalkyl, $C_1$-$C_{20}$ heterocycloalkyl, aryl, or heteroaryl and Y can be an anion (such as those mentioned above). A subset of compounds of formula (II) can be those in which each of $R_1$ and $R_2$, independently, is H, cyano, $COOR_a$, or $SO_3R_a$. For example, the primary amine of formula (II) can be

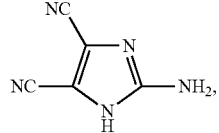

(Compound 11)

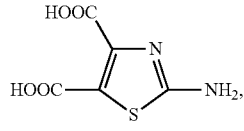

(Compound 12)

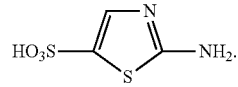

(Compound 13)

When the 5-membered heteroaromatic ring in the primary amine includes four ring heteroatoms, at least three of the ring heteroatoms can be nitrogen atoms. An example of such a 5-membered heteroaromatic ring is tetrazolyl. An example of a primary amine containing tetrazolyl is

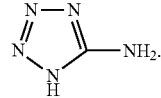

(Compound 14)

The primary amine described herein can also include one or more ionizable groups. An ionizable group is a group capable of forming an ionic group (i.e., an anionic group or a cationic group) in the medium of use. Ionizable groups forming anions include, for example, acidic groups or their salts. Examples of such ionizable groups include COOH, $SO_3H$, and their salts. Ionizable groups forming cations include, for example, amino groups or their salts. Other suitable ionizable groups have been described, for example, in U.S. Pat. No. 5,922,118. Without wishing to be bound by theory, it is believed that a pigment modified by a diazonium salt derived from a primary amine containing an ionizable group can result in a modified pigment containing the ionizable group, which has improved dispersibility in a medium of use (e.g., an aqueous medium in an inkjet ink composition). An ionizable group can be directly bonded to the 5-membered heteroaromatic ring in the primary amine or bonded to the 5-membered heteroaromatic ring through a linker such as a $C_1$-$C_{10}$ alkyl group or an aryl group (which can be optionally substituted by the substituents described herein).

The primary amine compounds described herein can be purchased from a commercial source (e.g., Sigma-Aldrich, St. Louis, Mo.) or made by methods known in the art.

In general, the primary amine containing a 5-membered heteroaromatic ring and an amino group can react with a diazotizing agent to form a diazonium salt containing the 5-membered heteroaromatic ring and a diazonium group (i.e., $—N_2^+$). During this reaction, the amino group in the primary amine is generally converted to a diazonium group, while the 5-membered heteroaromatic ring typically remains unchanged. Suitable diazotizing agents that can be used in this reaction include nitrous acid or its salts (e.g., its salts with alkaline and alkaline-earth metals), nitrosyl sulfuric acid, dinitrogen trioxide, alkyl nitrites, nitrosyl chloride, and nitrosyl bromide. The diazotizing agent can be pre-formed or can be formed in situ (e.g., by adding sodium nitrite and an acid to a mixture containing a primary amine).

Scheme 1 below illustrates a typical method for synthesizing diazonium salts using the primary amines of formulas (I) and (II). In this scheme, X, $R_1$, and $R_2$ can be the same as those defined above.

Scheme 1

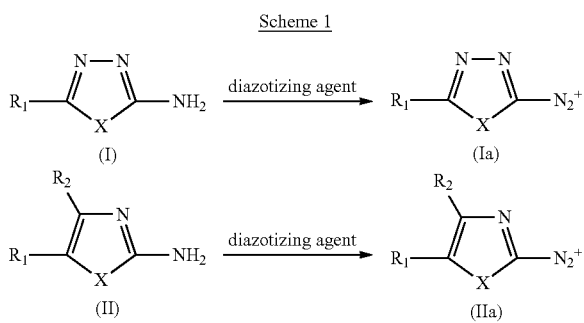

As shown in Scheme 1, the primary amines of formulas (I) and (II) can react with a diazotizing agent (e.g., $HNO_2$) to form diazonium salts containing cations of formulas (Ia) and (IIa), respectively. For example, Compounds 1-3 and 11-14 described above can form diazonium salts containing the following cations:

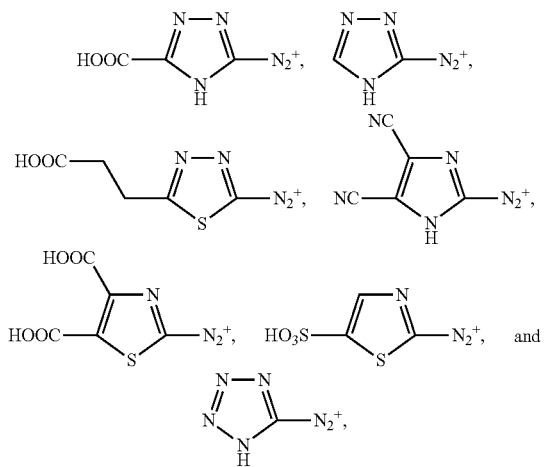

respectively.

The reactions shown in Scheme 1 are typically performed in the presence of an acid, such as sulfuric acid, phosphoric acid, acetic acid, or propionic acid, or mixtures thereof. Preferably, these reactions are performed at a pH of at most about 2.5 (e.g., at most about 2, at most about 1.5, or at most about 1). When the primary amine includes an acidic group (e.g., a carboxylic acid or sulfuric acid group), the amount of an additional acid required for forming a diazonium salt can be reduced or even eliminated.

The diazonium salt formed above can react with a pigment in a liquid medium to attach at least one organic group (e.g., an organic group containing a 5-membered heteroaromatic ring) to the surface of the pigment, thereby forming a modified pigment with improved dispersibility in an ink composition.

In general, the pigment can be any pigment that is capable of being modified with the attachment of at least one organic group. Suitable pigments include carbon blacks and colored pigments other than carbon and having no primary amines. The colored pigment can be blue, brown, cyan, green, violet, magenta, red, or yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyrathrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellow include Pigment Yellow 117 and Pigment Yellow 138. Other suitable examples of pigments include Pigment Yellow 1, 74, 155, 180, 185, 213, 218, 220, and 221, Pigment Red 254, and 269, and Pigment Blue 16 and 60. Examples of other suitable colored pigments are described in Colour Index, 3rd edition (The Society of Dyers and Cikiyrusts, 1982).

Without wishing to be bound by theory, it is believed that the diazonium salts described herein exhibit enhanced activity in modifying pigments, thereby resulting in modified pigments with a higher treatment level and therefore improved dispersibility in an ink composition (e.g., an aqueous composition). In addition, without wishing to be bound by theory, it is believed that the diazonium salts described herein can be used to effectively modify pigments that cannot be modified by conventional diazonium salts. For example, Compounds 1, 3, and 11 can be used to effectively modify Pigment Yellow 74, which to the inventor's knowledge is not otherwise modifiable by any known diazonium salt.

The liquid medium suitable for the pigment modifying reaction described above can be a polar medium. Examples of suitable media include water, a medium containing water, or a medium containing alcohol (e.g., ethanol or isopropanol). The liquid medium can be a solution, a dispersion, a slurry, or an emulsion.

The diazonium salt can be prepared in situ, i.e., in the presence of the pigment to be modified. For example, a modified pigment can be prepared by first adding a primary amine, an acid, and a pigment to a liquid medium (e.g., water) to form a mixture, and then adding a diazotizing agent (e.g., sodium nitrite) to the mixture. In such a method, the diazonium salt can react with the pigment as soon as it forms, thereby reducing the possibility of decomposition of the diazonium salt.

Alternatively, the diazonium salt can be pre-formed, i.e., formed in a mixture before a pigment to be modified is added to the mixture. For example, a modified pigment can be prepared by first adding a primary amine, an acid, and a diazotizing agent (e.g., sodium nitrite) to a liquid medium (e.g., water) to form a diazonium salt, and then adding a pigment into the mixture thus formed to prepare a modified pigment. As a primary amine containing a 5-membered heteroaromatic ring typically has a low basicity, it requires a large amount of an acid in order to form a diazonium salt. By pre-forming a diazonium salt, one can minimize the excess amount of acid used in such a reaction. On the other hand, when the diazonium salt is prepared in situ, such a reaction typically requires a larger amount of a liquid medium than that required for pre-forming a diazonium salt and therefore a larger amount of an acid in order for the diazonium salt to form, which can be more difficult to remove during the isolation of the modified pigment. Thus, pre-forming a diazonium salt can reduce the manufacturing costs when compared to the method in which the diazonium salt is prepared in situ.

The diazonium salt need only be sufficiently stable to allow reaction with a pigment to be modified. For example, a pigment modifying reaction can be carried out with a diazonium salt considered to be unstable and subject to decomposition. Further, a pigment modifying reaction can be carried out at an elevated temperature where a diazonium salt can be susceptible to decomposition. Performing a pigment modifying reaction at an elevated temperature can advantageously increase the solubility of the diazonium salt in the reaction medium or its reactivity towards a pigment, although an elevated temperature can result in some loss of the diazonium salt due to decomposition. Preferably, a modified pigment contains no by-products or unattached compounds.

A modified pigment prepared from a diazonium salt containing a 5-membered heteroaromatic ring includes the 5-membered heteroaromatic ring bonded to its surface. For example, diazonium salts containing cations of formulas (Ia) and (IIa) can react with a pigment to form a modified pigment having organic groups of formulas (Ib) and (IIb):

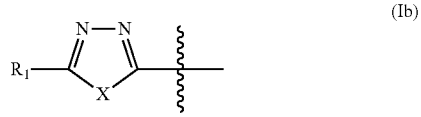
(Ib)

and

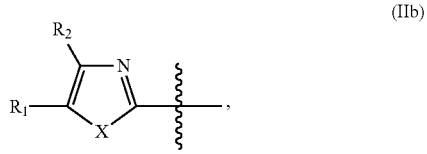
(IIb)

respectively, bonded to its surface. In formulas (Ib) and (IIb), X, $R_1$, and $R_2$ can be the same as those defined with respect to formulas (I) and (II). As an example, a pigment modified by a diazonium derived from Compounds 1-3 and 11-14 described above can have the following organic groups bonded to its surface:

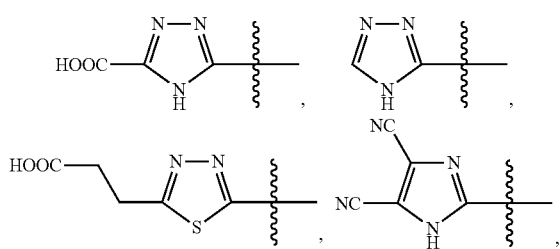

-continued

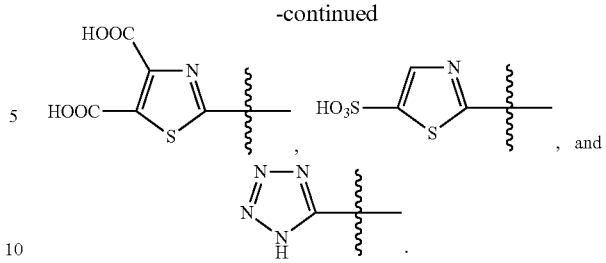

Depending on the reactivity or stability of the diazonium group in the diazonium salt, the organic groups of formulas (Ib) and (IIb) can be bonded to the surface of a pigment either directly or through a diazo group (i.e., —N=N—).

The 5-membered heteroaromatic ring can be present on the surface of the modified pigment at a treatment level of from about 2.7 mmol/cm$^2$ to about 66.6 mmol/cm$^2$ based on a nitrogen surface area of the modified pigment. As used herein, the term "treatment level" refers to the amount of an organic group (e.g., an organic group containing a 5-membered heteroaromatic ring) per unit of the surface of a modified pigment. The nitrogen surface area used to determine the treatment level mentioned above can be obtained by using ASTM D-4820. If an organic group containing an ionizable group (e.g., a carboxylic acid group) is introduced onto the surface of the pigment, the treatment level of the organic group can be determined by measuring the amount of the counterion to the ionizable group. For example, when the counterion is sodium ion, the sodium ion content can be measured by using an ion-selective electrode, atomic absorption spectroscopy, or inductively coupled plasma.

When the modified pigment includes carbon black, the treatment level can range from about 2.7 mmol/cm$^2$ to about 53 mmol/cm$^2$ (e.g., from about 6.7 mmol/cm$^2$ to about 32 mmol/cm$^2$) based on a nitrogen surface area of the modified pigment. When the modified pigment includes a color pigment other than carbon black, the treatment level can range from about 3.3 mmol/cm$^2$ to about 66.6 mmol/cm$^2$ (e.g., from about 8.3 mmol/cm$^2$ to about 40 mmol/cm$^2$) based on a nitrogen surface area of the modified pigment. Without wishing to be bound by theory, it is believed that if the treatment level is too low, a modified pigment does not have sufficient dispersibility in an aqueous medium typically used in an ink composition. In addition, without wishing to be bound by theory, it is believed that if the treatment level is too high, a modified pigment does not coagulate easily when an ink composition containing the modified pigment is in contact with paper and therefore can be smeared.

Without wishing to be bound by theory, it is believed that using a diazonium salt containing a 5-membered heteroaromatic ring can reduce the average particle size of a pigment. For example, a pigment before treated with a diazonium salt described herein can have a first average particle diameter and a modified pigment can have a second average particle diameter smaller than the first average particle diameter. The first average particle diameter can be at least about 140 nm (e.g., at least about 200 nm, at least about 300 nm, at least about 400 nm or at least about 500 nm) and the second average particle diameter can be at most about 130 nm (e.g., at most about 120 nm, at most about 110 nm, at most about 100 nm, at most about 90 nm, at most about 80 nm, at most about 70 nm, or at most about 60 nm). Without wishing to be bound by theory, it is believed that a modified pigment with a smaller average particle size can exhibit improved dispersibility in an ink composition and increase the gloss of an image printed from an ink composition containing such a pigment. Thus, one advantage of modifying a pigment with a diazonium salt described herein is that the cost for manufacturing a modified pigment with a small average particle size can be significantly reduced as it is typically expensive to use a pigment with a small average particle size as a starting material or to mechanically reduce the average particle size of a modified pigment after the modified pigment is produced.

The modified pigment formed above can be combined or mixed with a liquid vehicle to form an ink composition (e.g., a flexographic ink composition or an inkjet ink composition) by using methods well known in the art. The liquid vehicle can be a solution, a dispersion, a slurry, or an emulsion. The liquid vehicle can be an aqueous medium containing water (e.g., deionized or distilled water) or non-aqueous medium containing an organic solvent (e.g., an alcohol). For example, the amount of water or an organic solvent in an ink composition can range from about 60% to about 95% (e.g., from about 75% to about 90%) based on the weight of the ink composition. A flexographic ink composition can include a modified pigment described herein, a binder, and a solvent. An inkjet ink composition can include a modified pigment described herein and an aqueous vehicle (e.g., water or a water-containing mixture).

An ink composition can include suitable additives (e.g., humectants, biocides, binders, drying accelerators, penetrants, antifoaming agents, or surfactants) to impart certain desired properties while maintaining the stability of the compositions. For example, a humectant can be added to reduce the rate of evaporation of water in an ink composition to minimize print head nozzle clogging. If the ink composition begins to dry out, the humectant concentration increases and evaporation decreases further. Humectants can also affect other properties of the ink composition and the printed images made therefrom, such as viscosity, pH, surface tension, optical density, and print quality. Such humectants typically include ethylene glycol, propylene glycol, diethylene glycols, glycerine, dipropylene glycols, polyethylene glycols, polypropylene glycols, alkane diols, amides, ethers, carboxylic acids, esters, alcohols, organosulfides, organosulfoxides, sulfones, alcohol derivatives, 3-pyrrolidone, ether derivatives, amino alcohols, and ketones. The amount of a particular additive will vary depending on a variety of factors including the molecular weight of the polymers, the viscosity, the amount of any ammonium salt added, as well as the nature of the polymers, the nature of any organic groups attached to the pigment.

A printed image can be generated from an ink composition described herein by incorporating such a composition into a suitable printing apparatus (e.g., an inkjet printer) and generating an image onto a substrate. Examples of suitable ink jet printers include thermal printers, piezoelectric printers, continuous printers, and valve jet printers. An image can be printed on any suitable substrate, such as plain papers, bonded papers, coated papers, transparency materials, textile materials, plastics, polymeric films, and inorganic substrates.

The modified pigment described herein can also be used in aqueous coating compositions such as paints or finishes. For example, a coating composition can include a liquid vehicle (e.g., water or an alcohol), a modified pigment described herein, and a resin. In addition, the modified pigment described herein can be used in toners, color filters, and electrophoretic displays. For example a toner or a color filter composition can include a modified pigment described herein, a resin and one or more suitable additives. An electrophoretic display material may include a modified pigment described herein and a charge control agent.

All publications, references, applications, and patents referred to herein are incorporated by reference in their entirety.

The following examples are illustrative and not intended to be limiting.

Example 1

Treatment of Pigment Red 122 with Diazonium Salts Derived from Compound 1 and p-aminobenzoic Acid (PABA)

A. Diazotization of 2-Aminotriazole-5-Carboxylic Acid (i. E., Compound 1)

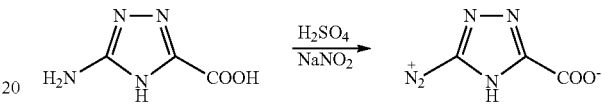

52.5 ml of 1 M NaOH solution and 100 ml water were sequentially added to 6.4 g (50 mmol) of ground Compound 1 in a beaker. The mixture was stirred at room temperature until Compound 1 was completely dissolved. After 25 ml of 2 M $NaNO_2$ solution was added, the mixture thus obtained was added to a mixture of 40 ml of 2M $H_2SO_4$, 40 g of ice, and 125 ml of water within 30 minutes using a peristaltic pump. The temperature of the mixture was maintained below 5° C. during this process. After the addition was complete, the excess of nitrite was checked by using starch-KI paper, and if the result is negative, a few drops of 2M $NaNO_2$ were added. The diazonium salt solution (containing a diazonium content of about 50 mmol) was kept on ice and used within 30-60 minutes.

B. Treatment of Pigment Red 122 with Diazonium Salts Derived from Compound 1 and PABA A 1-liter 3-neck round bottom flask with an overhead stirrer (Teflon blade) was charged with 89 g of a presscake of Pigment Red 122 (which contained 25 g of the pigment). The diazonium salt solution generated in part A was added to the pigment at once and the mixture was stirred at approximately 100 RPM for 3 hours. An sample of the reaction mixture was tested for the presence of the diazonium salt by using an H-acid spot check. An H-acid spot check is performed as follows: A drop of an H-acid solution, i.e., 0.1 g of H-acid (i.e., 1-amino-8-hydroxynaphtalene-3,6-disulfonic acid) dissolved in 10 ml of 5% sodium bicarbonate solution, is placed on a filter paper and a drop of the reaction mixture is put next to it. When the clear runout of the reaction mixture touches H-acid spot, a strong reddish-violet coloration appears if a diazonium salt is present in the reaction mixture. The treatment of Pigment Red 122 was considered complete when no diazonium salt was found using the H-acid spot check mentioned above. After the pH of the reaction mixture was adjusted to 9, the mixture was sonicated for 3 hours using MISONIX S-4000 Ultrasound Liquid Processor. The dispersion thus obtained was purified by diafiltration with 5 volumes of DI water until the permeate conductivity was below 200 μsiemens. At this time, the dispersion had a solid content around 15%.

Pigment Red 122 was also treated with a diazonium salt derived 6.7 g (50 mmol) of PABA (a primary amine containing a 6-membered aromatic ring) using the same procedure described above as a comparison.

Incorporation of the organic group in a diazonium salt onto the pigment surface was monitored by measuring the sodium content in final dispersion (on dry basis) by using an Orion-Ross sodium ion-selective electrode connected to a millivolt-meter, assuming that 1 mmol of sodium ion is equivalent to 1 mmol of grafted anion. The average particle diameters of the modified Pigment Red 122 were measured by a NANOTRAC laser scattering instrument. The sodium contents and average particle diameters of the modified Pigment Red 122 were summarized in Table 1 below.

TABLE 1

| Treating agent | Treating agent/Pigment molar ratio | Sodium content (ppm) | Diazo Yield | Nanotrac data (nm) $M_v$ | 50% | 95% |
|---|---|---|---|---|---|---|
| Compound 1 | 2 | 6,056 | 16.7% | 130 | 121.4 | 344 |
| PABA | 2 | 3,967 | 11.1% | 141.1 | 131.5 | 344 |

The results showed that Pigment Red 122 modified by the diazonium salt derived from Compound 1 had a significantly smaller $M_v$ average particle diameter than that of Pigment Red 122 modified by the diazonium salt derived from PABA. In addition, the results showed that the diazonium salt derived from Compound 1 attached about 50% more organic groups onto the surface of Pigment Red 122 than the diazonium salt derived from PABA.

Example 2

Treatment of Various Pigments with a diazonium Salt Derived from Compound 1

Four pigments, i.e., Pigment Red 122 (PR122), Carbon Black (BP700 grade made by Cabot Corporation), Pigment Blue 15:4 (PB15:4), and Pigment Yellow 74 (PY74), were treated with the diazonium salt derived from Compound 1 following the procedures described in Example 1. PR122 had an average particle diameter $M_v$ of 300 nm. The results are shown in Table 2 below.

TABLE 2

| Pigment | Treating agent | Treating agent/Pigment molar ratio | Sodium Content (ppm) | Nanotrac ($M_v$) (μm) | Diazo Yield |
|---|---|---|---|---|---|
| PR122 | Compound 1 | 1.5 | 5084 | 0.1276 | 17.7% |
| BP700 | Compound 1 | 1.5 | 10879 | 0.1411 | 37.9% |
| PB15:4 | Compound 1 | 1.5 | 7784 | 0.1141 | 27.1% |
| PY74 | Compound 1 | 1.5 | 3559 | 0.1899 | 12.4% |

The results showed that the diazonium salt derived from Compound 1 effectively modified PR122, BP700, and PB15:4 by attaching organic groups on their surfaces. In addition, PR122 modified by the diazonium salt derived from Compound 1 has a much smaller average particle diameter than the unmodified pigment.

The results also show that the diazonium salt derived from Compound 1 can modify PY74 by attaching organic groups onto its surface. As shown in Shakhnovich, "Dispersant chemistry gives up its secrets", Eur. Coatings J., Issue 6, p. 28, (2006), Pigment Yellow 74 is not modifiable by using a diazonium salt derived from a primary amine containing a 6-membered aromatic ring such as p-aminobenzenesulfonic acid and PABA.

Example 3

Treatment of Pigment Red 122 with a diazonium Salt Derived from Compound 2

A 1-liter 3-neck round bottom flask with an overhead stirrer (Teflon blade) was charged with 89.2 g of a presscake of Pigment Red 122 (containing 28% (i.e., 25 g) of the pigment), followed by 700 ml of DI water and 40 ml of 2M $H_2SO_4$. After 4.2 g (50 mmol) of 3-amino-1,2,4-triazole (Compound 2) was added, the mixture was stirred for 45 minutes to homogeneity at room temperature. 25 ml of a 2M sodium nitrite solution was then added to the mixture over a period of 5 minutes while the mixture was stirred continuously. Some foaming was observed during the addition. After the nitrite addition was completed, a H-acid spot check was performed and showed a strongly positive result. Stirring continued for 3 hours at room temperature, at which point the H-acid spot check showed a negative result. The pH of the mixture was adjusted to 8 by adding an 1M NaOH solution. The mixture was then sonicated for 3 hours using MISONIX S-4000 Ultrasound Liquid Processor. The resulting dispersion was purified by diafiltration with 6 volumes of DI water until the permeate conductivity was below 200 μsiemens. At this time, the dispersion had a solid content around 13%. The magenta dispersion thus obtained had a $M_v$ average particle diameter of 167.2 nm measured by a NANOYRAC laser scattering instrument. The sodium content of the modified pigment in the final dispersion (on dry basis) was 1,160 ppm.

Example 4

Treatment of Various Pigments with a diazonium Salt Derived from Compound 3

A 1-liter 3-neck round bottom flask with an overhead stirrer (Teflon blade) was charged with 256 g of a presscake of Pigment Yellow 74 (which contained 37.3 g of the pigment), followed by 7.68 g (44.4 mmol) of 3-(2-amino-1,3,4-thiadiazol-5-yl)propanoic acid (i.e., Compound 3) and 219 ml of 2M $H_2SO_4$. The mixture was stirred for 45 minutes to form a homogeneous mixture, which was cooled with ice-salt bath to around 0° C. When this temperature was reached, 23 ml of a 2M sodium nitrite solution was added using a peristaltic pump over the period of 20 minutes. Some foaming was observed and, at the end of addition, a H-acid spot check was performed and showed a strongly positive result. The mixture was continuously stirred for 3 hours at 0° C., at which point the result of the H-acid spot check became negative. After the reaction mixture was filtered, the precipitate of the modified yellow pigment was washed thoroughly with 600 ml DI water. The precipitate was then mixed with 500 ml DI water and the pH of the mixture was adjusted to 8 by adding 1M solution of NaOH. The mixture was heated for 1 hour at 80° C. for pigment ripening and then sonicated for 3 hours using MISONIX S-4000 Ultrasound Liquid Processor. The resulting dispersion was purified by diafiltration with 6 volumes of DI water until the permeate conductivity was below 200 μsiemens. At this time, the dispersion had a solid content around 18%. It was centrifuged at 4,500 rpm for 30 minutes to remove large particles.

Pigment Red 122, BP700, and Pigment Blue 15:4 were also treated with the diazonium salt derived from Compound 3 using the procedures described above. PR122 had an average particle diameter $M_v$ of 300 nm.

The average particle diameters of the modified pigments and the sodium contents of the modified pigments in the final dispersion (on dry basis) were measured. The results are summarized in Table 3 below.

TABLE 3

| Pigment | Treating agent/Pigment molar ratio | Sodium Content (ppm) | Nanotrac ($M_v$) (μm) | Nanotrac (50%) | Nanotrac (100%) |
|---|---|---|---|---|---|
| PR122 | 2 | 3600 | 0.1046 | 0.1001 | 0.243 |
| BP700 | 2 | 5302 | 0.1303 | 0.1234 | 0.344 |
| PB15:4 | 2 | 4353 | 0.1072 | 0.0929 | 0.344 |
| PY74 | 1.2 | 2090 | 0.1978 | 0.1901 | 0.578 |

The results show that the diazonium salt derived from Compound 3 effectively modified PR122, BP700, and PB15:4 by attaching organic groups on their surfaces to obtain modified pigments with small average particle size. The results also show that the diazonium salt derived from Compound 3 effectively modified PY74, which is not modifiable by using a diazonium salt derived from a primary amine containing a 6-membered aromatic ring such as p-aminobenzenesulfonic acid and PABA.

Example 5

Treatment of Various Pigments with a diazonium Salt Derived from Compound 11

A. Diazotization of 2-Aminoimidazole-4,5-Dinitrile (Compound 11)

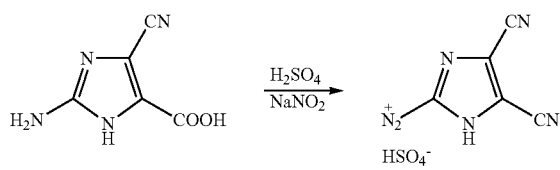

35 ml of 1M $H_2SO_4$ and 75 ml water were added to 3.99 g (30 mmol) of Compound 11 in a beaker. 15.5 ml of 2 M $NaNO_2$ solution was then added to the mixture using a peristaltic pump over a period of 30 minutes at room temperature. The mixture thus obtained was stirred for 30 minutes, at which point the excess of nitrite was checked by using a starch-KI paper and, if the result was negative, a few drops of 2M $NaNO_2$ were added. The dispersion of the diazonium salt thus formed (having a diazonium content of about 30 mmol) can be stored at room temperature for 4-6 hours without decomposition.

B. Treatment of Various Pigment with the Diazonium Salt Derived from Compound 11

A 2-liter 3-neck round bottom flask with an overhead stirrer (Teflon blade) was charged with 214 g of a presscake of Pigment Red 122 (PR122; containing 28% (i.e., 60 g) of the pigment) followed by 214 g water and the diazonium salt solution generated in part A. After the mixture was stirred at approximately 100 rpm for 30 minutes, it was heated to 60° C. and kept at this temperature for 45 minutes. At this point, an H-acid spot check showed an negative results, indicating that the diazonium salt was completely consumed by the reaction. The pH of the reaction slurry was then brought up to 9 using an 1 M solution of sodium hydroxide, and the slurry was sonicated for 3 hours using MISONIX S-4000 Ultrasound Liquid Processor. The resulting mixture was purified by diafiltration with 6 volumes of DI water until the permeate conductivity was below 200 μsiemens. At this time, the dispersion had a solid content around 15%. The dispersion was then centrifuged at 4,500 rpm for 30 minutes to remove large particles.

Treatment of Pigment Blue 15:4 (PB15:4) and Pigment Yellow 74 (PY74) using Compound 11 was conducted in a manner similar to that described above. The results are summarized in Table 4 below.

TABLE 4

| Pigment | Sodium content (ppm) | Nanotrac data (nm) | | |
|---|---|---|---|---|
| | | $M_v$ | 50% | 95% |
| PR122 | 4720 | 115.2 | 105.5 | 208.7 |
| PB15:4 | 5579 | 102 | 95.3 | 344 |
| PY74 | 2136 | 194.6 | 192.9 | 409 |

As shown in Table 4, the diazonium salt derived from Compound 11 effectively modified PR122, PB15:4, and PY74 by attaching an organic group on their surfaces. In addition, prior to treatment, these three pigments have an average particle size $M_v$ in the range of between 400 nm and 700 nm. As shown in Table 4, the diazonium salt derived from Compound 11 significantly reduced the average particle diameter of these three pigments.

Example 6

Treatment of Various Pigments with a diazonium Salt Derived from Compound 12

Pigment Red 122 and BP700 were treated with a diazonium salt derived from Compound 12 in a manner similar to that described in Example 4 except that 2M $H_2SO_4$ was replaced with 2 equivalents of nitric acid.

The average particle diameters of the modified pigments and the sodium contents of the modified pigments in the final dispersion (on dry basis) were measured. The results are summarized in Table 5 below.

TABLE 5

| Pigment | Treating agent/Pigment molar ratio | Sodium Content (ppm) | Nanotrac ($M_v$) (μm) | Shear | Heat |
|---|---|---|---|---|---|
| PR122 | 2 | 4213 | 0.1408 | low | no |
| BP700 | 2 | 5758 | 0.1458 | low | no |
| PR122 | 2 | 4505 | 0.1328 | Silverson | 60 C. |

As shown in Table 5, the diazonium salt derived from Compound 12 effectively modified PR122 and BP700 by attaching an organic group on their surfaces to obtain modified pigments with small average particle size.

Example 7

Treatment of Pigment Red 122 with a diazonium Salt Derived from Compound 13

A stainless steel beaker was charged with 107 g of a presscake of Pigment Red 122 (which contained 30 g of the pigment), followed by 6.51 g of 2-aminothiazole-4-sulfonic acid (i.e., Compound 13) and 350 g of deionized (DI) water. After the mixture was homogenized with a SILVERSON L4RT-A rotor-stator high shear mixer at 6,500 rpm, a solution of 2.54 g of NaNO$_2$ in 20 ml DI water was added dropwise within 10 minutes. The mixing was continued for 2 hours. At the end of this period, the temperature reached 70° C. due to the heat released during mixing (no external heater was used). After the pH of the mixture was adjusted to 4.0 with 1 M NaOH solution, the mixture thus formed was purified by diafiltration with 5 volumes of DI water until the permeate conductivity was below 200 μsiemens. At this time, the dispersion had a solid content around 16%. The dispersion was sonicated for 1 hour using MISONIX S-4000 Ultrasound Liquid Processor and centrifuged at 4,500 rpm for 20 minutes to remove large particles. The magenta dispersion thus obtained had an average particle diameter M$_v$ of 90 nm measured by a NANOTRAC laser scattering instrument.

As a comparison, Pigment Red 122 was also treated with diazonium salts derived from p-aminobenzenesulfonic acid and p-aminobenzoic acid using the same procedures described above except that, when Pigment Red 122 was treated with the diazonium salt derived from p-aminobenzoic acid, 2 equivalents of nitric acid was added the reaction mixture prior to the addition of NaNO$_2$.

The results show that a modified pigment with a very small particle size can be prepared by treating a pigment with a diazonium salt derived from Compound 13 (i.e., a primary amine containing a 5-membered heteroaromatic ring). By contrast, when a pigment was treated with a diazonium salt derived from p-aminobenzenesulfonic acid and p-aminobenzoic acid (i.e., primary amines containing a 6-membered aromatic ring), the modified pigment thus obtained had an average particle diameter M$_v$ of no less than 125-135 nm.

Example 8

Treatment of Various Pigments with a diazonium Salt Derived from Compound 13

Four pigments, i.e., Pigment Red 122 (PR122), Pigment Blue 15:4 (PB15:4), and BP700, were treated with the diazonium salt derived from Compound 13 following the procedures described in Example 7. The results are shown in Table 6 below.

TABLE 6

| Pigment | Treating agent/ Pigment molar ratio (eq.) | Sodium Content (ppm) | | | Nanotrac (μm) | | |
|---|---|---|---|---|---|---|---|
| | | Actual | Theoretical | Yield | M$_v$ | 50% | 90% |
| PR122 | 1.2 | 2531 | 22543 | 11.2% | 0.090 | 0.083 | 0.146 |
| PB15:4 | 1.2 | 2342 | 22543 | 10.4% | 0.112 | 0.100 | 0.186 |
| BP700 | 0.5 | 3587 | 10517 | 34.1% | 0.134 | 0.122 | 0.204 |
| BP700 | 1 | 6996 | 19378 | 36.1% | 0.137 | 0.126 | 0.208 |

The results show that the diazonium salt derived from Compound 13 effectively modified PR122, PB15:4, and BP700 by attaching organic groups on their surfaces to obtain modified pigments with small average particle size.

Other embodiments are in the claims.

What is claimed is:

1. A method, comprising:
reacting a pigment with a diazonium salt comprising a 5-membered heteroaromatic ring and a diazonium group directly bonded to the 5-membered heteroaromatic ring, thereby forming a modified pigment that comprises the 5-membered heteroaromatic ring;

wherein the 5-membered heteroaromatic ring comprises three ring heteroatoms, at least two of which are nitrogen atoms, and wherein the diazonium salt comprises 1,2,4-triazolyl, 1,2,3-triazolyl, 1,3,4-thiadiazolyl, 1,2,4-thiadiazolyl, 1,2,3-thiadiazolyl, 1,2,5-thiadiazolyl, 1,3,4-oxadiazolyl, 1,2,4-oxadiazolyl, 1,2,3-oxadiazolyl, or 1,2,5-oxadiazolyl or a compound of formula:

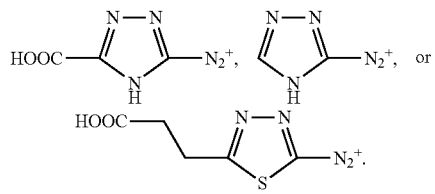

2. The method of claim 1 wherein the diazonium salt comprises 1,2,4-triazolyl or 1,3,4-thiadiazolyl.

3. A method, comprising:
reacting a pigment with a diazonium salt comprising a 5-membered heteroaromatic ring, thereby forming a modified pigment that comprises the 5-membered heteroaromatic ring;
wherein the diazonium salt comprises a cation of formula:

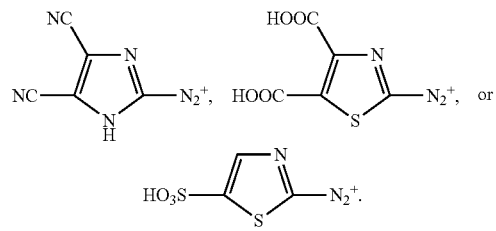

4. An ink composition, comprising:
a liquid vehicle; and
a material comprising a pigment and an organic group bonded to the pigment, the organic group comprising only one aromatic ring and the only one aromatic ring being a 5-membered heteroaromatic ring;

wherein the 5-membered heteroaromatic ring comprises three ring heteroatoms, at least two of which are nitrogen atoms, and wherein the organic group comprises 1,2,4-triazolyl, 1,2,3-triazolyl, 1,3,4-thiadiazolyl, 1,2,4-thiadiazolyl, 1,2,3-thiadiazolyl, 1,2,5-thiadiazolyl, 1,3,4-oxadiazolyl, 1,2,4-oxadiazolyl, 1,2,3-oxadiazolyl, or 1,2,5-oxadiazolyl or a compound of formula:

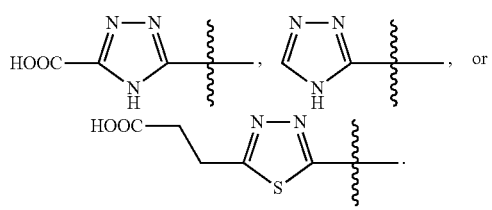

5. The composition of claim 4, wherein the organic group comprises 1,2,4-triazolyl or 1,3,4-thiadiazolyl.

6. The composition of claim 4, wherein the pigment comprises Pigment Yellow 1, 74, 155, 180, 185, 213, 218, 220, or 221, Pigment Red 122, 202, 254, or 269, Pigment Blue 15, 16, or 60, or Pigment Violet 19.

7. A composition, comprising:
a pigment; and
an organic group bonded to the pigment, the organic group comprising only one aromatic ring and the only one aromatic ring being a 5-membered heteroaromatic ring; wherein the 5-membered heteroaromatic ring comprises three ring heteroatoms, at least two of which are nitrogen atoms, and
wherein the organic group comprises 1,2,4-triazolyl, 1,2,3-triazolyl, 1,3,4-thiadiazolyl, 1,2,4-thiadiazolyl, 1,2,3-thiadiazolyl, 1,2,5-thiadiazolyl, 1,3,4-oxadiazolyl, 1,2,4-oxadiazolyl, 1,2,3-oxadiazolyl, or 1,2,5-oxadiazolyl or a compound of formula

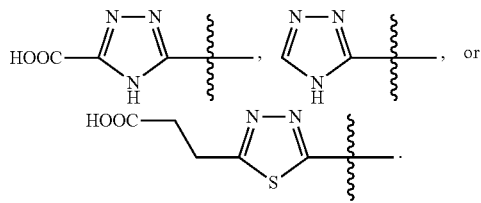

8. An ink composition, comprising:
a liquid vehicle; and
a material comprising a pigment and an organic group bonded to the pigment;
wherein the organic group is

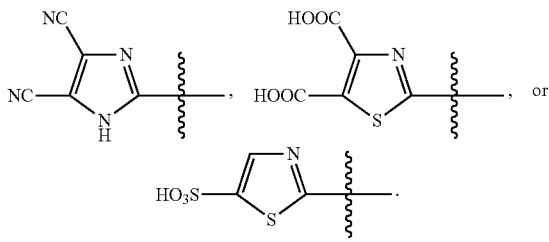

9. The composition of claim 8, wherein the pigment comprises Pigment Yellow 1, 74, 155, 180, 185, 213, 218, 220, or 221, Pigment Red 122, 202, 254, or 269, Pigment Blue 15, 16, or 60, or Pigment Violet 19.

10. A composition, comprising:
a pigment; and
an organic group bonded to the pigment, the organic group being of formula

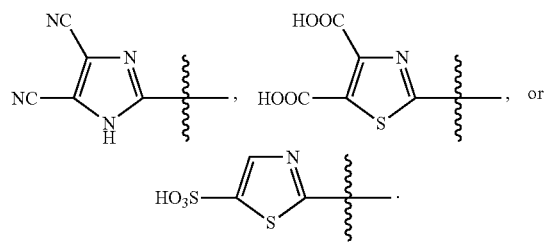

* * * * *